United States Patent [19]

Keintzel et al.

[11] Patent Number: 5,397,381
[45] Date of Patent: Mar. 14, 1995

[54] METHOD OF COOLING AND OPTIONALLY CLEANING A HOT GAS, ESPECIALLY OF A GAS GENERATED UPON COMBUSTION OR GASIFICATION OF CARBON-CONTAINING FUELS

[75] Inventors: Günter Keintzel, Engelskirchen; Horst-Dieter Oldenburg; Karl-Heinz Dinstühler, both of Gummersbach; Michael Schötz, Leverkusen, all of Germany

[73] Assignee: L. & C. Steinüller GmbH, Gummersbach, Germany

[21] Appl. No.: 119,607

[22] Filed: Sep. 9, 1993

[30] Foreign Application Priority Data

Sep. 11, 1992 [DE] Germany .................. 42 29 895.4

[51] Int. Cl.⁶ ............................................ B01D 47/02
[52] U.S. Cl. ................................ 95/213; 95/223; 95/226; 95/229; 55/256; 55/269; 55/229
[58] Field of Search ............ 95/213, 216, 219, 220, 95/223, 226, 228, 229; 55/229, 244, 256, 267–269

[56] References Cited

U.S. PATENT DOCUMENTS

| | | | |
|---|---|---|---|
| 2,899,012 | 8/1959 | Davis | 95/229 |
| 3,331,194 | 7/1967 | Reed et al. | 55/256 X |
| 3,733,782 | 5/1973 | Hatchel | 55/256 X |
| 3,766,716 | 10/1973 | Ruiz | 55/256 X |
| 3,793,809 | 2/1974 | Tomany et al. | 95/223 X |
| 4,005,999 | 2/1977 | Carlson | 95/226 X |
| 4,239,515 | 12/1980 | Yanagioka et al. | 55/223 |
| 4,284,609 | 8/1981 | deVries | 95/228 X |
| 4,377,132 | 3/1983 | Koog et al. | 55/244 X |
| 4,394,139 | 7/1983 | Board | 55/229 X |
| 5,004,486 | 4/1991 | Chen | 55/256 X |

FOREIGN PATENT DOCUMENTS

| | | | |
|---|---|---|---|
| 0374323 | 6/1990 | European Pat. Off. | |
| 2131657 | 6/1971 | Germany . | |
| 2421143 | 5/1974 | Germany . | |
| 575293 | 4/1958 | Italy | 55/244 |
| 629972 | 5/1982 | Switzerland . | |

*Primary Examiner*—Robert Spitzer
*Attorney, Agent, or Firm*—Robert W. Becker & Associates

[57] ABSTRACT

In a method of cooling and scrubbing a hot gas a hot gas is supplied with a removal pipe into a scrubber. The hot gas is introduced into at least one liquid bath of the scrubber. The hot gas is forcibly dispersed to form small bubbles over at least a portion of a flow path of the hot gas through the liquid bath. The exterior of the removal pipe is cooled with liquid to be introduced into the liquid bath by guiding the liquid along the exterior of the removal pipe countercurrent to the flow of the hot gas in the removal pipe. The device for performing the method has at least one liquid bath. A removal pipe for removing hot gas from the combustion chamber and guiding it to the liquid bath is provided. At least one flow divider with a plurality of openings is arranged in the flow path of the hot gas. A gas removal device is positioned above the liquid bath for removing the cooled gas exiting from the liquid bath. A first cooling mantle surrounds at a distance the removal pipe and extends over a predetermined length of the removal pipe such that between the removal pipe and the first cooling mantle a first annular space is formed through which fresh liquid is introduced into the liquid bath.

11 Claims, 5 Drawing Sheets

METHOD OF COOLING AND OPTIONALLY CLEANING A HOT GAS, ESPECIALLY OF A GAS GENERATED UPON COMBUSTION OR GASIFICATION OF CARBON-CONTAINING FUELS

The invention relates firstly to a method of cooling and optionally cleaning (scrubbing) a hot gas, especially of an impellent gas generated by combustion or gasification of carbon-containing fuels, in which the hot gas is introduced into a liquid bath, especially a water bath, and after flowing through the liquid bath is removed at the top of the liquid bath.

During the generation of an impellent gas from finely divided coal or coke by combustion and/or gasification a preferred operating temperature of approximately 1000° to 1600° C. is maintained in the combustion chamber, whereby pressures of 1 to 250 bar are present. Other hot gases, that are to be cooled, may be generated, for example, in chemical processes.

In order to cool the hot impellent gas generated in a combustion chamber and to separate (scrub) at least partially remaining ashes or other solid materials entrained in the hot gas and resulting from the combustion, in the method known from European patent 374 323-B1 the gas is guided through a liquid bath, commonly a water bath. The removal pipe is an immersion tube that is immersed into the liquid bath and the introduction and distribution of the hot gas is achieved with the zig-zag-shaped free edge of the immersion tube. The gas introduced into the liquid bath rises in the form of gas bubbles of a relatively great diameter within the liquid bath. The great gas bubbles, due to pulsations, cause strong mechanical loads of the immersion tube. Furthermore, the heat transfer from the hot gas into the liquid is inefficient due to the great bubble diameter and the phase boundary areas, i.e., the surface area between gas and water is relatively small. This means that the scrubbing of solid particles entrained within the gas is not optimal. For cooling of the immersion tube the water that feeds into the liquid bath is applied as a film onto the end of the immersion tube adjacent to the combustion chamber. This requires a relatively complicated construction of the water distribution system.

It is an object of the present invention to provide a method with which the load of the removal pipe is reduced and the scrubbing of possibly entrained solid particles is improved.

SUMMARY OF THE INVENTION.

This object is solved by dispersing the gas in the form of small bubbles at least over a portion of its flow path through the liquid bath in a forcible manner.

The inventive method of cooling and scrubbing a hot gas is primarily characterized by the following steps:
  supplying a hot gas with a gas removal pipe into a scrubber;
  introducing the hot gas into at least one first liquid bath of the scrubber;
  forcibly dispersing the hot gas to form small bubbles over at least a portion of a flow path of the hot gas through the at least one first liquid bath; and
  cooling the exterior of the gas removal pipe with liquid to be introduced into the at least one first liquid bath by guiding the liquid along the exterior of the gas removal pipe countercurrent to the flow of the hot gas in the gas removal pipe.

Preferably, the method further comprises the step of cooling the exterior surface of the at least one first liquid bath.

Expediently, the method further comprises the steps of:
  immersing the gas removal pipe into the at least one first liquid bath so that the hot gas flows past the free circumference of the gas removal pipe into the at least one first liquid bath; and
  positioning a flow divider with through-openings into the flow path of the hot gas within the at least one first liquid bath such that large gas bubbles of the hot gas impact the flow divider for dispersing.

Advantageously, the method further comprises the steps of:
  positioning a second liquid bath below the gas removal pipe so as to be spaced from a free end of the gas removal pipe; and
  deflecting the hot gas exiting from the gas removal pipe to introduce the hot gas into the at least one first liquid bath positioned above the second liquid bath.

The present invention is also concerned with a device for performing the inventive method. The device according to the present invention is primarily characterized by:
  at least one liquid bath;
  a gas removal pipe for removing a hot gas from a chamber and guiding the hot gas to the at least one liquid bath;
  at least one flow divider, having a plurality of openings, being arranged in a flow path of the hot gas;
  a gas removal device positioned above the at least one liquid bath for removing the cooled gas exiting from the at least one liquid bath;
  a cooling device for cooling the gas removal pipe;
  a first cooling mantle surrounding at a distance the gas removal pipe and extending over a predetermined length of the gas removal pipe such that between the gas removal pipe and the first cooling mantle a first annular space is formed for introducing fresh liquid therethrough into the at least one liquid bath.

Preferably, the device further comprises a pressure container with an inner wall surface for receiving the at least one liquid bath, and a second cooling mantle, for delimiting the at least one liquid bath, connected at a distance to the inner wall surface of the pressure container and extending over substantially a length of the first cooling mantle. A second annular space is thus defined between the inner wall surface and the second cooling mantle. Fresh liquid is introduced through the second annular space into the at least one liquid bath.

Expediently, the upper edge of the first cooling mantle and the upper edge of the second cooling mantle are in the form of zigzag-shaped supply weirs.

Advantageously, the device further comprises a connector connected to the second annular space. A connecting line for connecting the second annular space to the first annular space is provided.

The gas removal pipe has preferably a free end that is immersed into the at least one liquid bath. The at least one flow divider is positioned at a predetermined distance above the free end of the gas removal pipe and extends substantially perpendicular to an axis of the gas removal pipe.

The device preferably further comprises a second liquid bath. In this arrangement, the gas removal pipe has a free end that is spaced from a liquid surface of the second liquid bath. The at least one first liquid bath is positioned above the second liquid bath and surrounds the gas removal pipe. The at least one first liquid bath has a bottom that forms the flow divider.

Expediently, a plurality of the first liquid baths are arranged atop one another and surround the gas removal pipe, wherein the hot gas, divided into partial streams and subsequently recombined, flows sequentially through the liquid baths.

Due to the force generation of smaller bubbles within the water bath, the danger of pulsation is reduced and the phase boundary area is increased so that the scrubbing effect is improved.

When the removal pipe in the form of an immersion tube is inserted into the liquid bath and the gas flows via the free circumference into the liquid bath, the forced dispersion may be achieved by having the gas bubbles of a greater diameter which are rising within the liquid bath impacting on a dispersion insert, respectively, a flow separator, provided with through-openings so that the gas, after passing through the flow separator, is in the form of smaller gas bubbles and in this form travels the remaining part of its flow-through path.

It is however also possible to achieve the forced dispersion to form smaller bubbles such that, when embodying the removal pipe as an immersion tube, the gas is introduced into the liquid bath in the form of a plurality of partial streams through the wall of the immersion tube. Since in this method the gas stream is divided in a defined manner into a plurality of partial streams when leaving the immersion tube, the formation of bubbles of a greater diameter is substantially prevented.

In an especially safe manner smaller bubbles are generated when the gas stream exits the removal pipe above a first liquid bath, is deflected, and subsequently introduced in a plurality of partial streams into at least one second liquid bath which is arranged above the first liquid bath.

Here it is favorable to at least once divided the gas emerging from the second liquid bath into a plurality of partial streams and introduce it into a third liquid bath.

In all of these methods it is advantageous to cool the removal pipe outwardly with the liquid guided into the liquid bath or baths before the liquid enters the bath.

The invention is also concerned with a device for cooling and optionally cleaning a hot gas, especially a hot impellent gas generated by combusting carbon-containing fuels in a combustion or gasification chamber, the device having: an elongated removal pipe for guiding away the hot gas from the lower end of a chamber, especially the combustion chamber, at least one liquid bath coordinated with the removal pipe, and one removal device above the liquid bath for the cooled and at least partially scrubbed gas.

For generating a dispersed gas in the form of bubbles of a smaller diameter within the liquid bath, it is inventively suggested that in the flow path of the gas upon introduction of the gas into the liquid bath or within the liquid bath itself a flow divider for the gas with a plurality of through-openings is provided.

When the removal pipe is embodied as an immersion tube immersed into the liquid bath, in a preferred embodiment it is suggested that within the liquid bath in a prescribed distance above the free edge of the immersion tube at least one flow divider is arranged which extends substantially perpendicularly to the immersion tube.

On the other hand, for an embodiment of the removal pipe as an immersion tube, the immersion tube itself may be provided with a plurality of openings at a prescribed distance from the upper edge of the immersion tube so that a section of the immersion tube serves as a flow divider.

On the other hand, in the operational state the removal pipe may end at a prescribed distance from the surface of a first liquid bath and the removal tube may be surrounded by at least one second liquid bath spaced at a distance from the first liquid bath, the bottom of which is designed as a flow divider.

As will be described in the following, it is advantageous when a plurality of liquid baths surround the removal tube in a stacked arrangement through which baths the gas, divided into partial streams and then recombined, flows.

In this context it is expedient that the upper liquid bath is supplied with fresh liquid and that the liquid bath arranged below is supplied with liquid via openings of the flow divider of the upper bottom and/or through at least one overflow in the upper liquid bath.

In order to cool the removal pipe, the removal pipe is surrounded at a prescribed distance and over a predetermined length by a cooling mantle defining a liquid bath, whereby fresh liquid is supplied through the thus created annular space into the liquid bath.

When, as in the prior art disclosed in European patent 374 323, the combustion chamber generating the hot gas and the liquid bath, as components of the device, are surrounded by a pressure container, it is also expedient for cooling the pressure container in the area of the removal pipe that in this area a cooling mantle spaced at a distance and also limiting the liquid bath is provided, whereby through the resulting annular space fresh liquid can be supplied to the liquid bath.

The upper edges of the cooling mantles can preferably be embodied as zig-zagged supply weirs.

In order to supply both annular spaces, delimited by the cooling mantles, in a simple manner from the exterior of the container, it is expedient to provide the outer annular space with an outer connector and to connect the inner annular space to the outer annular space via at least one connecting line.

When the flow divider is not provided in the wall of the removal pipe, but as a separate component, it may be in the form of a perforated sheet, mesh, grate system, or rod system etc.

BRIEF DESCRIPTION OF THE DRAWINGS.

The inventive method and different embodiments of the inventive device will be described with the aid of the enclosed figures for an example of a hot impellent gas generated in a combustion chamber by combustion, respectively, gasification of carbon-containing fuels.

It is shown in.

DESCRIPTION OF PREFERRED EMBODIMENTS

It should be noted that in FIGS. 1 to 4 the operational water levels are taken into consideration.

Figure 1:
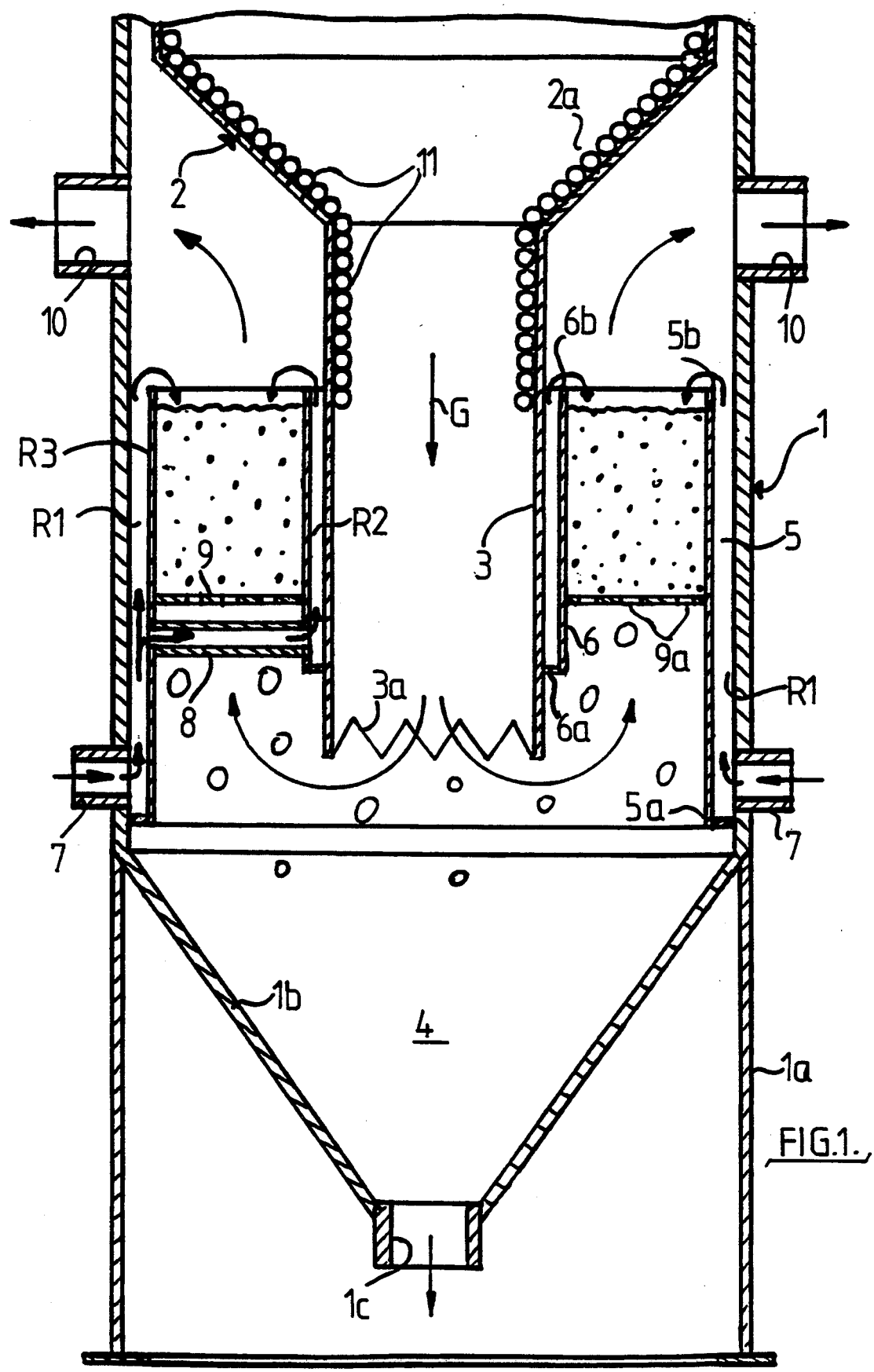
FIG. 1 a longitudinal section of a first embodiment of the inventive device with a removal pipe in the form of an immersion tube and a flow divider surrounding the removal pipe.

As can be seen in FIG. 1, a combustion chamber 2 is arranged in a pressure Container 1 on a support construction 1a. A fuel and an oxygen-containing gas are supplied to the combustion chamber in a manner not represented in detail.

To the tapered lower end 2a of the combustion chamber 2 a removal pipe 3 is connected which is in the form an immersion tube through which the generated hot gas G and the liquid or solid particles entrained therein are removed downwardly from the combustion chamber. The removal tube 3 has a free edge 3a with a zig-zag arrangement. The immersion tube 3 is immersed into a liquid bath 4. The liquid bath 4 is delimited by the lower portion of the pressure container 1 in the form of a funnel and by a mantle 5 spaced at a distance from the container wall and having a lower edge 5a that is connected to the inner wall of the container.

Figure 4:
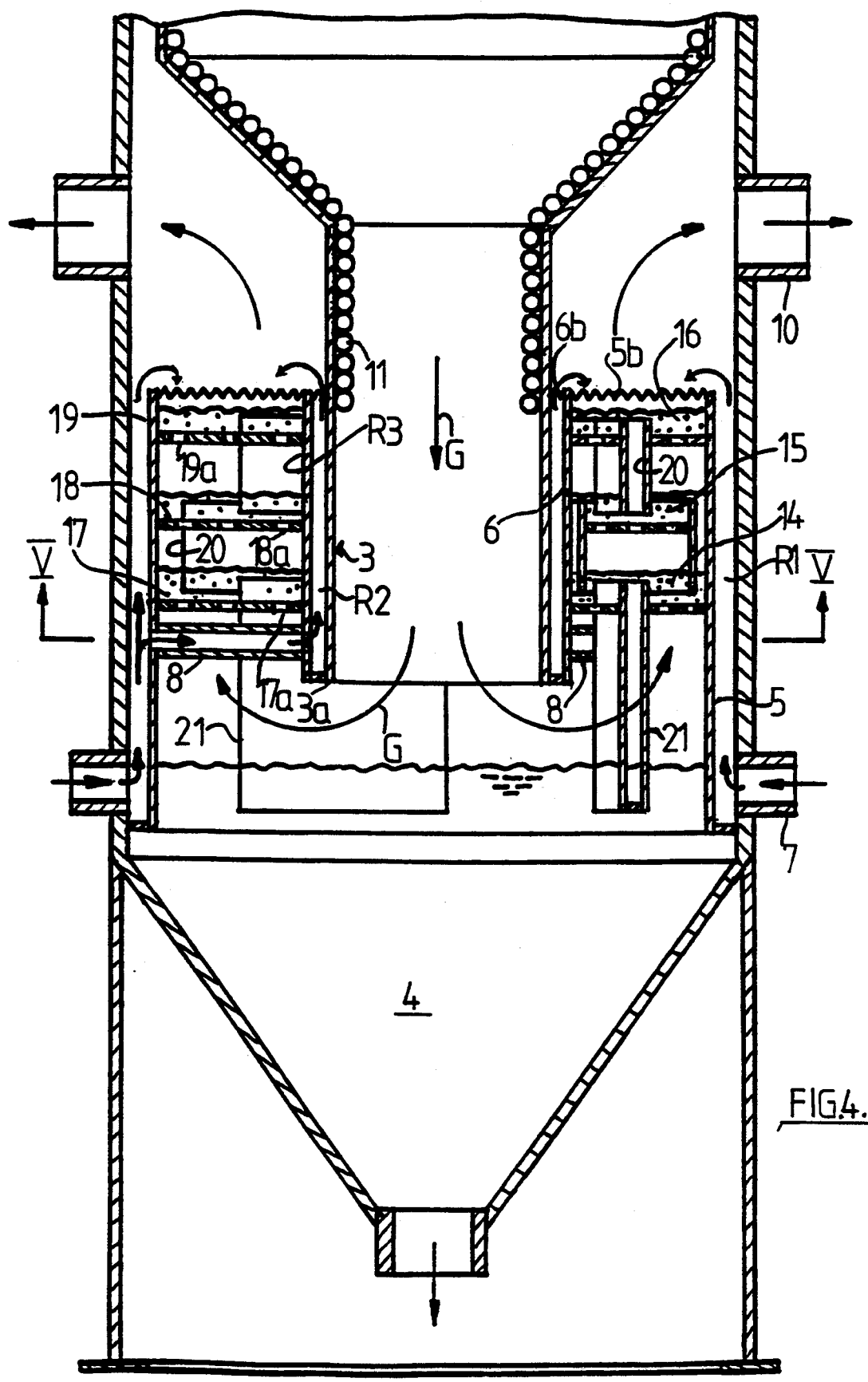

Spaced from the immersion tube 3 a further mantle 6 is arranged having a lower edge 6a that is connected, spaced at a distance from the zig-zag arrangement 3a, to the outer surface of the removal pipe and the upper edge 6b of which is positioned at the same level as the upper edge 5b of the mantle 5. The annular space R1 defined by the inner wall of the container and the mantle 5 can be supplied with water via one or more connectors 7. Via one or more radially extending connecting lines 8 the water can enter from the outer annular space R1 into the inner annular space R2. The free edges 5b and 6b are preferably zig-zagged and in the form of overflow weirs as is shown in FIG. 4.

Between the two mantles 5 and 6 a horizontally extending ring-like perforated sheet 9 with through-openings 9a is inserted as a flow divider.

In FIG. 1 it is schematically shown that after the gas exits from the removal pipe 3 and enters the liquid bath 4 at first bubbles of a relatively great diameter are formed. The large bubbles rising within the annular space R3 between the removal tube 3 and the mantle 6, respectively, within the outer mantle 5 impact on the perforated sheet 9 and are there destroyed so that the gas is dispersed into the annular space above the perforated sheet 9 in the form of smaller bubbles within the liquid bath. The cooled gas that is at least partially scrubbed of solid particles is removed from the container mantle via the gas removal socket 10.

The diameter of the through-openings 9a within the perforated sheet 9 is selected such that, on the one hand, the desired dispersion effect is achieved, and, on the other hand, solid particles separated above the perforated sheet can be removed downwardly into the funnel 1b of the container from where they are removed at the lower end 1c.

In FIG. 1 it is represented that the portion of the immersion tube that is not surrounded by the liquid bath and the combustion chamber may be provided with separate cooling pipes 11.

With this embodiment it is ensured on the one hand, that the desired dispersion can be achieved, and, on the other hand, the immersion tube as well as the container are cooled in a preferred manner.

Figure 2:
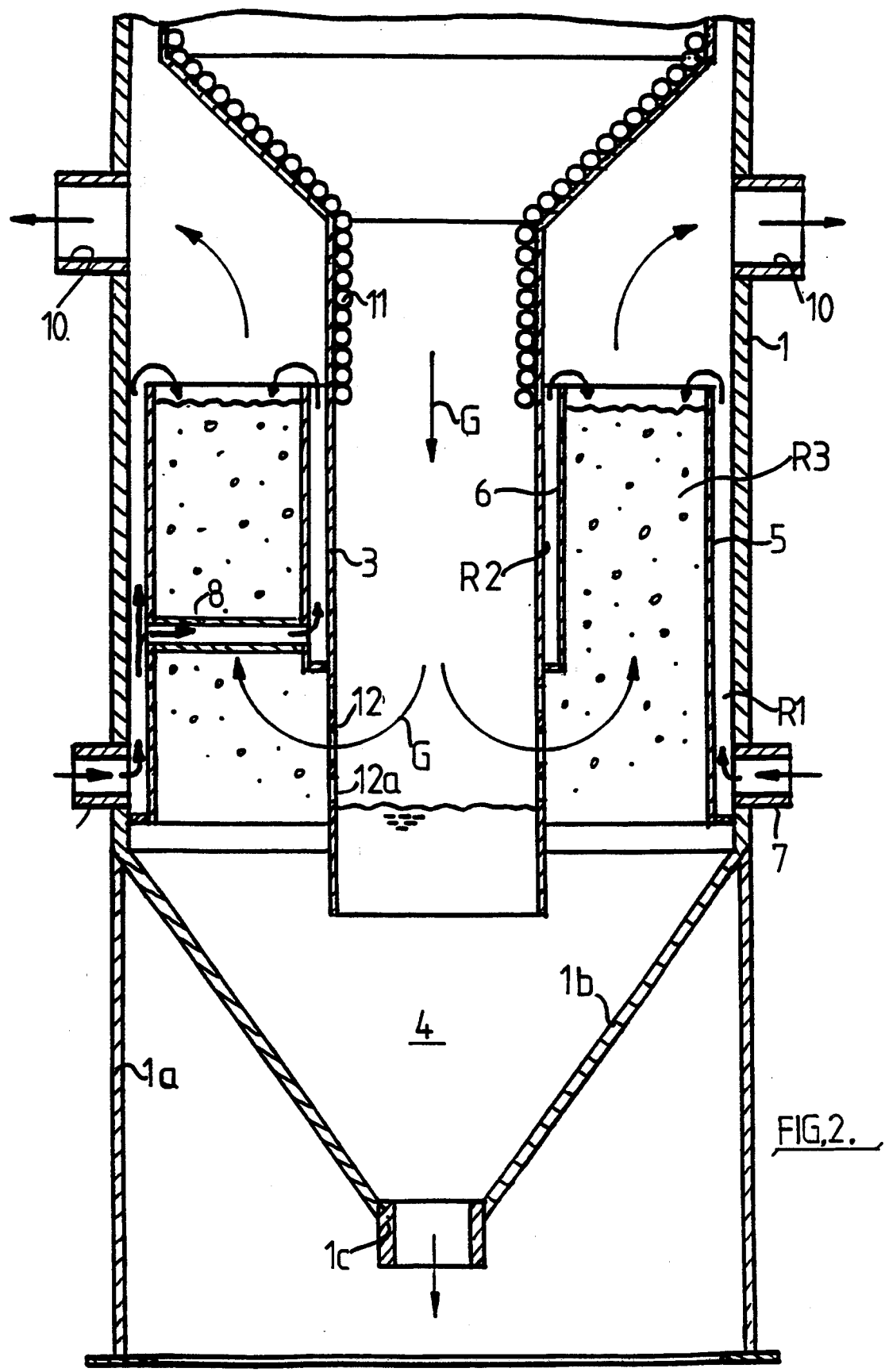
FIG. 2 a longitudinal section of an embodiment of the inventive device with immersion tube, whereby a section of the immersion tube is in the form of a flow divider, FIG. 3 a longitudinal section of a further embodiment of the inventive device comparable to FIG. 2, whereby however the flow divider is in the form of a conically widening section of the immersion tube, FIG. 4 a longitudinal section along the arrows IV—IV in FIG. 5 through an embodiment of the inventive device wherein the removal tube is surrounded by at least one liquid bath supported by a flow divider, and FIG. 5 a horizontal section along the line V—V in FIG. 4.
Figure 3:
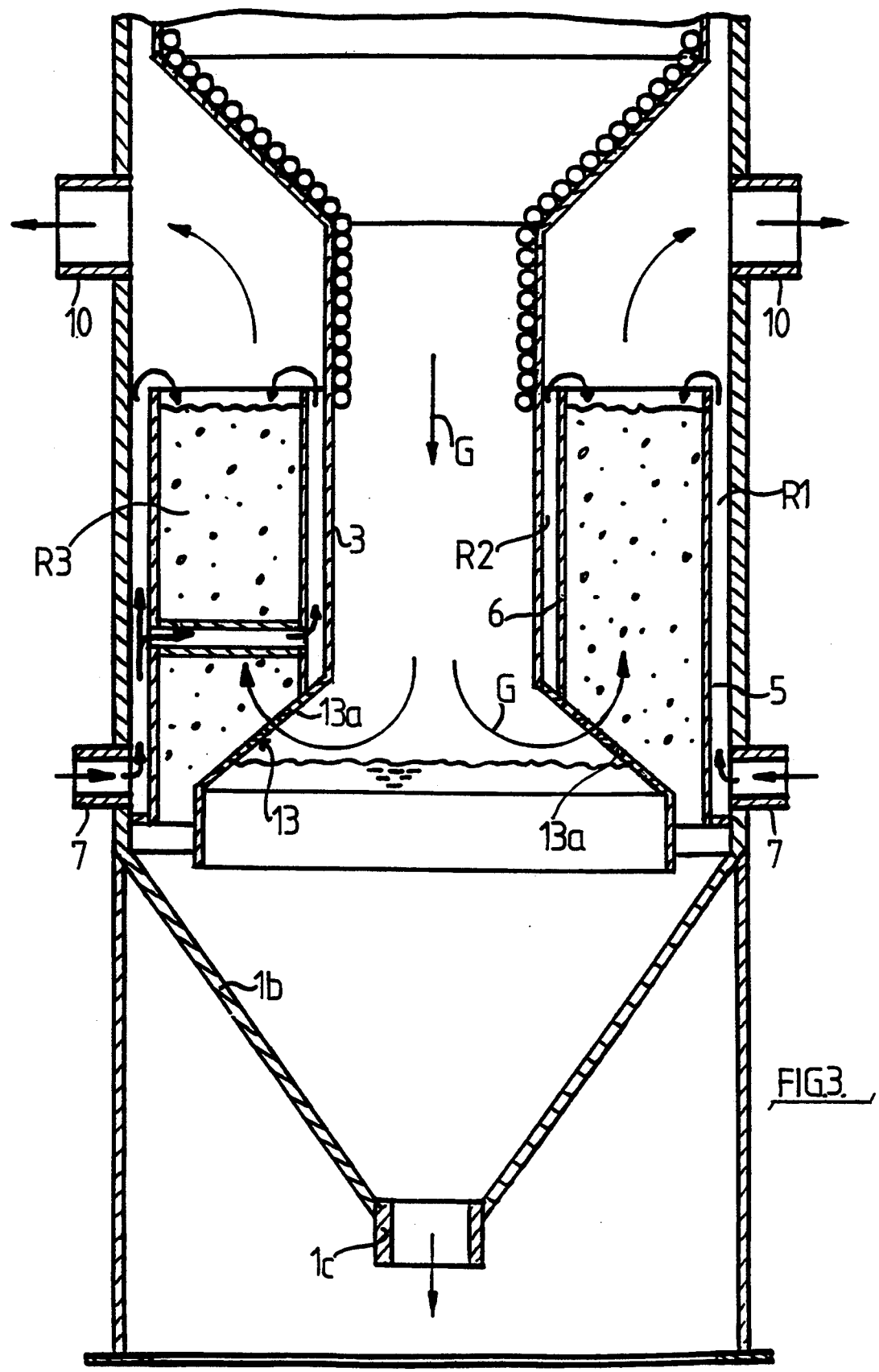
Figure 5:
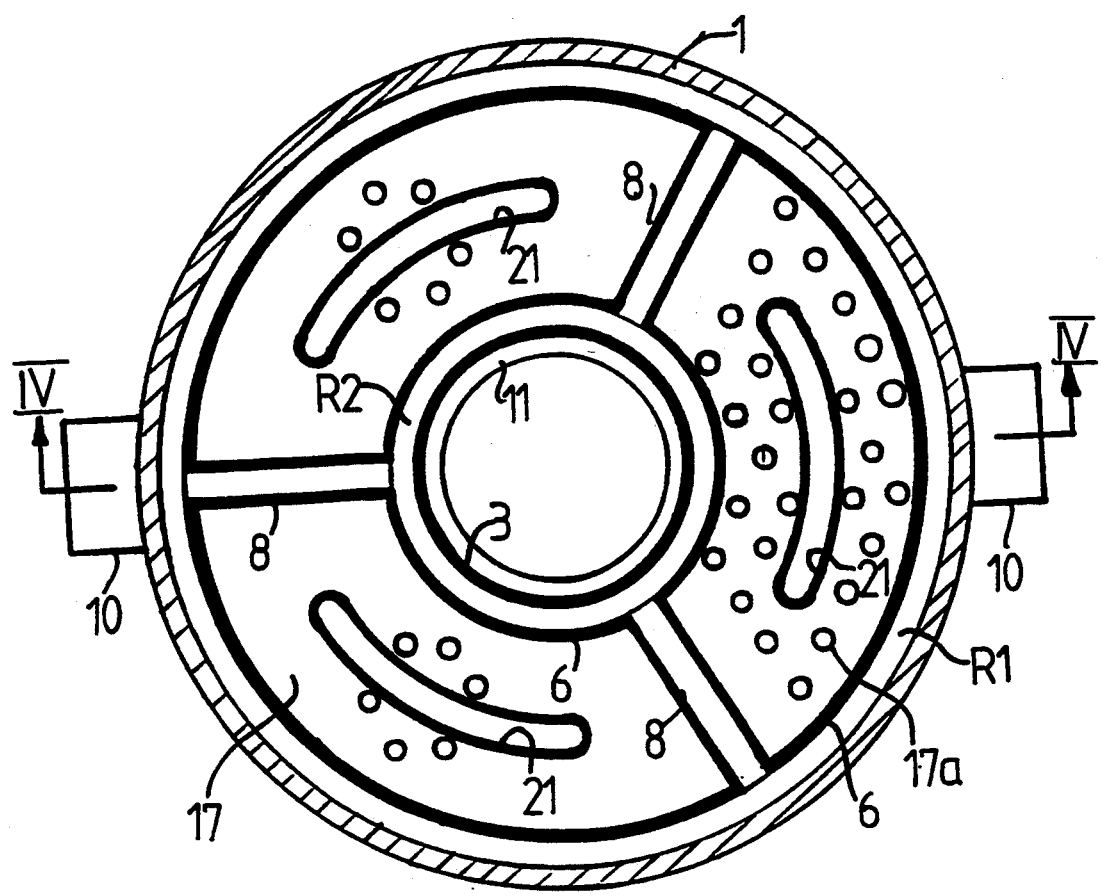

In the embodiment according to FIG. 2 and the embodiments according to FIGS. 3 to 5 the reference numerals have been retained where possible. The embodiment according to FIG. 2 differs from the embodiment according to FIG. 1 substantially in that no separate flow divider in the form of a perforated sheet 9 is required, but a separate section 12 of the immersion tube 3 is provided with through-openings 12a so that the gas to be cooled and scrubbed enters the liquid bath already in the form of defined partial streams of smaller diameters so that the formation of greater bubbles is prevented from the beginning.

While in the embodiment according to FIG. 2 the bubbles of the gas entering the liquid bath are rising relatively closely to the removal tube 3, in the embodiment according to FIG. 3 it is suggested to distribute the partial streams substantially over the annular space R3 between the removal pipe and the container wall, respectively, between the mantles 5 and 6. For this purpose, the through-openings are provided in the conically widened section 13 of the immersion tube in the form of holes 13a. This arrangement furthermore has the advantage that the removed solid particle component can be deposited outside on the conical surface of the section 13 so as to be laterally removed and safely guided to the removal opening 1c.

In the embodiment shown in FIGS. 4 and 5 the scrubbing and cooling liquid is distributed into four baths i.e., into the liquid bath 4 serving as a sump, which is substantially provided in the funnel-shaped lower portion of the pressure container 1, and into the three further baths 14, 15, and 16 which are built one atop another within the annular space R3 by perforated sheets 17, 18, and 19 with openings 17a, 18a, 19a extending between the two mantle sheets 5 and 6. The removal pipe 3 ends at a prescribed distance from the surface of the liquid bath 4 in the lower portion of the container. The lower bath 14 substantially takes over the function of the gas scrubber and the subsequent baths 15 and 16 have the function of cooling (quenching). The gas G introduced from the top is deflected at the lower free edge 3a by 180° in the upward direction whereby already a portion of the solid particles is separated and thus does not impact on the lower perforated sheet 17. Subsequently, the gas flows via the entire free cross-section between the mantles 5 and 6 onto the perforated bottom 17 which divides the gas into a plurality of partial streams. The quenching water, respectively, scrubbing water is supplied to the upper bath 16 via the annular space R1 and R2 and flows downwardly in counterflow to the gas. Accordingly, the water supplied to the upper bottom 19 and the following bottoms is divided into two partial streams. One partial stream rains through the holes 19a into the lower liquid bath 15 so that the solid particles scrubbed within the liquid bath 16 are also guided downwardly. For a respective dimensioning of the through-openings in the perforated bottoms with respect to the through-opening diameter, the number of through-opening, and their distribution an intensive mixing of gas and water in the individual liquid baths is ensured and simultaneously the aforementioned raining is made possible. Through the openings, for example, 50% of the liquid volume to be distributed of the upper arranged liquid bath can be removed. For the transfer of the other partial stream from an upper liquid bath into a lower liquid bath, the baths are connected by overflow tubes 20 with weir-type upper ends.

The amount of water that rains through the through-openings is adjusted such that a uniform loading of the respective perforated bottom with washing liquid and thus a uniform gas distribution is ensured.

Due to the cooling of the gas a corresponding portion of the water is vaporized and entrained with the upwardly moving gas. Via the free edges 5b and 6b, as is true also in the other embodiments, enough water is supplied to the upper bottom 19 as is required for the function of the inserted bottoms. This additional amount of water flows via the overflow tubes 21, coordinated with the lowermost bottom 17 and immersed into the sump 4, and rains through the through-openings of the lowermost bottom 17a into the sump 4 and cools the sump. Due to the amount of water raining from the bottom 17 a prescrubbing of the deflected gas flowing towards the perforated bottom 17 is achieved.

The overflow tubes 20 and 21 may have a circular cross-section. A bent slotted through-opening configuration is preferred as is shown in FIGS. 4 and 5, see especially FIG. 4. The overflow tubes which are coordinated with the individual perforated sheets, are angularly staggered, as shown in FIG. 4, from perforated sheet to perforated sheet.

The gas velocity within the through-openings of the bottoms 17, 18, and 19 and the distance between the bottoms is adjusted such that an introduction of water droplets, containing the solid particles, into the downstream bottom, in the flow direction of the gas, is as small as possible.

As with the other embodiments, the gas removal pipe 3 is cooled against high thermal loads by the hot gas with the liquid guided within the annular space R2 between tubes 3 and mantle 6. This is also true for the annular space R3 in the container. For a small load, under certain circumstances, it may be possible to eliminate the mantles, and the perforated sheets may then extend from the removal pipe to the container wall. The water supply then must be correspondingly adapted.

In all of the above described embodiments, the lower end of the combustion chamber 2 is directly connected to the removal pipe 3. However, it is also possible that between the combustion chamber 2 and the removal pipe 3 a heat exchanger etc. is interposed.

The present invention is, of course, in no way restricted to the specific disclosure of the specification and drawings, but also encompasses any modifications within the scope of the appended claims.

What we claim is:

1. A method of cooling and scrubbing a hot gas comprising the steps of:
    supplying a hot gas with a gas removal pipe into a scrubber;
    introducing the hot gas into at least one first liquid bath of the scrubber;
    forcibly dispersing the hot gas to form small bubbles over at least a portion of a flow path of the hot gas through the at least one first liquid bath; and
    cooling the exterior of the gas removal pipe with liquid to be introduced into the at least one first liquid bath by guiding the liquid along the exterior of the gas removal pipe countercurrent to the flow of the hot gas in the gas removal pipe.

2. A method according to claim 1, further comprising the step of cooling the exterior surface of the at least one first liquid bath.

3. A method according to claim 1, further comprising the steps of:
    immersing the gas removal pipe into the at least one first liquid bath so that the hot gas flows past the free circumference of the gas removal pipe into the at least one first liquid bath; and
    positioning a flow divider with through-openings into the flow path of the hot gas within the at least one first liquid bath such that large gas bubbles of the hot gas impact the flow divider for dispersing.

4. A method according to claim 1, further comprising the steps of:
    positioning a second liquid bath below the gas removal pipe so as to be spaced from a free end of the gas removal pipe; and
    deflecting the hot gas exiting from the gas removal pipe to introduce the hot gas into the at least one first liquid bath positioned above the second liquid bath.

5. A device for cooling a hot gas comprising:
    at least one first liquid bath;
    a gas removal pipe for removing a hot gas from a chamber and guiding the hot gas to said at least one first liquid bath;
    at least one flow divider, having a plurality of openings, being arranged in a flow path of the hot gas;
    a gas removal device positioned above said at least one first liquid bath for removing the cooled gas exiting from said at least one first liquid bath;
    a cooling device for cooling said gas removal pipe;
    a first cooling mantle surrounding at a distance said gas removal pipe and extending over a predetermined length of said gas removal pipe such that between said gas removal pipe and said first cooling mantle a first annular space is formed, wherein fresh liquid is introduced through said first annular space into said at least one first liquid bath.

6. A device according to claim 5, further comprising:
    a pressure container with an inner wall surface for receiving said at least one first liquid bath; and
    a second cooling mantle, for delimiting said at least one first liquid bath, connected at a distance to said inner wall surface of said pressure container and extending over substantially a length of said first cooling mantle, thus defining a second annular space between said inner wall surface and said second cooling mantle, wherein fresh liquid is introduced through said second annular space into said at least one first liquid bath.

7. A device according to claim 6, wherein an upper edge of said first cooling mantle and an upper edge of said second cooling mantle are in the form of zigzag-shaped supply weirs.

8. A device according to claim 6, further comprising:
    a connector, for supplying water to said second annular space, connected to said second annular space; and
    a connecting line for connecting said second annular space to said first annular space.

9. A device according to claim 5, wherein:
    said gas removal pipe has a free end and is immersed with said free end into said at least one first liquid bath; and
    said at least one flow divider is positioned at a predetermined distance above said free end of said gas removal pipe and extends substantially perpendicular to an axis of said gas removal pipe.

10. A device according to claim 5, further comprising a second liquid bath, and wherein:
said gas removal pipe has a free end that is spaced from a liquid surface of said second liquid bath;
said at least one first liquid bath is positioned above said second liquid bath and surrounds said gas removal pipe; and
said at least one first liquid bath has a bottom that forms said at least one flow divider.

11. A device according to claim 10, wherein a plurality of said first liquid baths are arranged atop one another and surround said gas removal pipe, wherein the hot gas, divided into partial streams and subsequently recombined, flows sequentially through said first liquid baths.

* * * * *